J. BIJUR.
REGULATING SYSTEM.
APPLICATION FILED JAN. 27, 1911.
1,140,106.
Patented May 18, 1915.
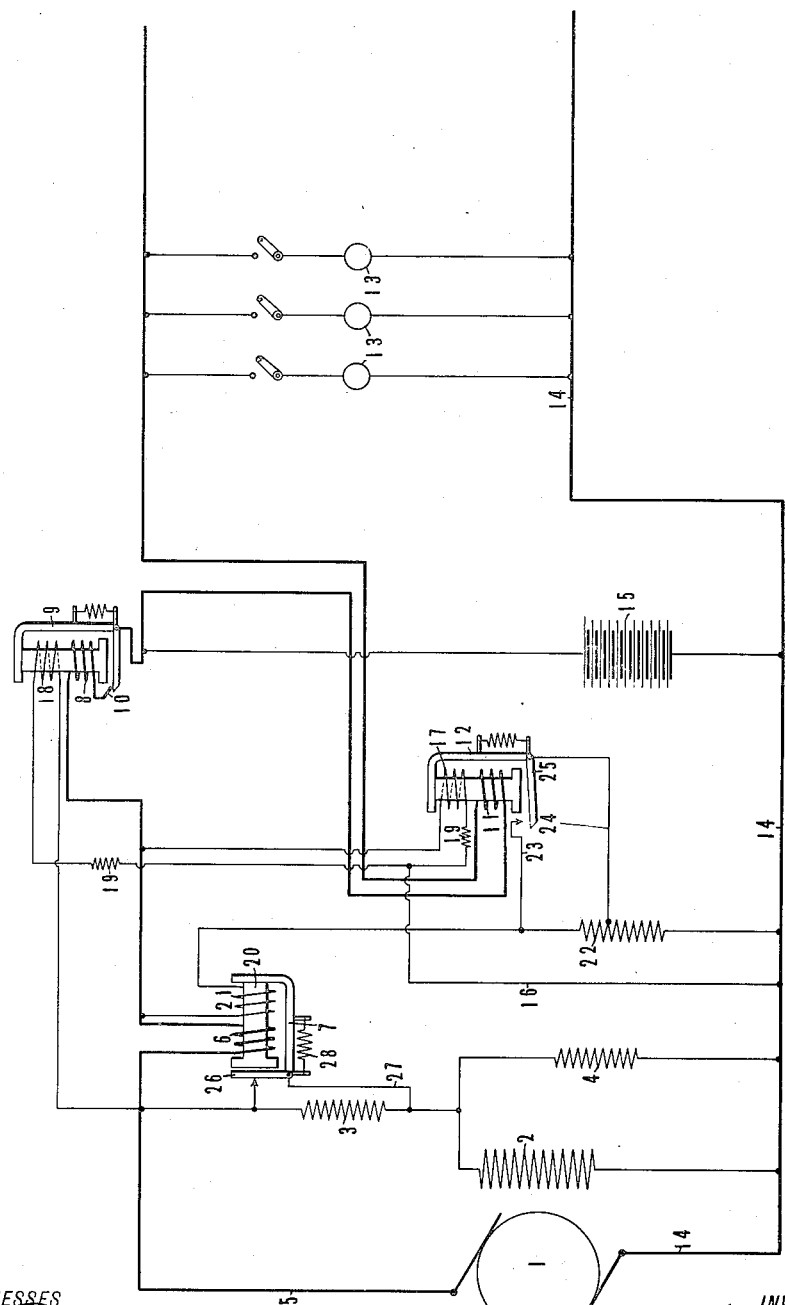
WITNESSES
INVENTOR
ATTORNEYS

UNITED STATES PATENT OFFICE.

JOSEPH BIJUR, OF NEW YORK, N. Y., ASSIGNOR TO THE SAFETY CAR HEATING AND LIGHTING CO., OF NEW YORK, N. Y., A CORPORATION OF NEW JERSEY.

REGULATING SYSTEM.

1,140,106.  Specification of Letters Patent.  Patented May 18, 1915.

Application filed January 27, 1911. Serial No. 604,958.

*To all whom it may concern:*

Be it known that I, JOSEPH BIJUR, a citizen of the United States, residing at New York, in the county of New York and State of New York, have invented certain new and useful Improvements in Regulating Systems, of which the following is a full, clear, and exact description, such as will enable others skilled in the art to which it appertains to make and use the same.

This invention relates to electrical regulating apparatus.

One of the objects thereof is to provide regulating apparatus adapted to efficiently charge a storage battery from a generator running at varying speeds and to meet various contingencies arising in the practical use of a lighting system in which current is derived from a battery or generator of this type.

Another object is to provide apparatus of the above general nature in which the battery is charged at the proper rate and the generator reliably protected against overcharge.

Another object is to provide apparatus of the said nature in which the generator is used substantially to its full capacity and corresponding economy gained in the current drawn from the battery.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

The accompanying drawing is a diagrammatic view of one of various possible embodiments of this invention.

Referring now to this drawing in detail, there is shown at 1 a generator which may be driven in any desired manner, as by the axle of a railway truck. The shunt field 2 of this generator has in series therewith a resistance element 3 and connected in parallel therewith a resistance element 4.

The main 5 of generator 1 leads through a series coil 6 upon a regulating device 7 and thence through the series coil 8 of a main switch 9, the latter being of well known construction. From the contact 10, to which the circuit from main 5 is completed upon the main switch being closed, the main leads through a series coil 11 upon a cut-out device 12 and thence to the lamps 13. The main 14 leads directly to these lamps and across the mains there is bridged a storage or secondary battery 15, the point of connection of the battery branch with main 5 being on the generator side of the coil 11, as shown.

Leading from main 14 is a conductor 16 which divides into two branches, one of which passes through a voltage coil 17 in the cut-out 12 and the other of which passes through the voltage coil 18 of the main switch 9 and thence to main 5 at a point upon the generator side of the coil 6. It is to be noted that there are serially connected in circuit with each of the voltage coils 17 and 18 suitable resistance elements 19, the latter being formed of a metal of substantially zero temperature co-efficient and being proportioned to minimize the effect of change in temperature of these voltage coils. Wound about the core 20 on the regulator 7 is a voltage coil 21 having serially connected therewith a resistance 22. Bridged about a portion of this resistance are the conductors 23 and 24, the circuit between which is controlled by the movable contact 25 of the cut-out 12. The action of these parts will hereinafter be described in detail.

Referring now to the regulator 7, it may be noted that the core 20 presents a magnetic field strength equal to the sum of the magnetic effects of the coils 6 and 21 and controls the position of the spring-retracted vibrating member 26. As this member vibrates it makes and breaks circuit in a shunt 27 about the resistance 3. The latter shunt is normally closed by the action of the spring 28 and the coils 6 and 21 are so formed and proportioned that either with a predetermined maximum charging current through coil 6 and empty battery charging voltage across the mains, or with a predetermined proper finishing charging current through coil 6 and fully charged battery voltage across the mains, they will conjointly exert just sufficient force to open shunt 27 about resistance 3 and materially weaken the field 2 of the generator.

The coils 17 and 11 upon the cut-out 12 are differentially wound so that the current flowing to the lamps through the latter tends to neutralize the effect of the former coil. This coil 17 is so formed and proportioned that upon the battery becoming fully charged, it will attract the member 25, closing the shunt about a portion of resistance 22, and the latter is so proportioned and connected that upon this shunt being closed, the field of the coil 21 is so strengthened that with the voltage of a fully charged battery across the mains, it will attract the member 26 with zero current flowing in the coil 6 and break the shunt about the resistance 3. The coil 11 is so proportioned that upon the lamp-load being thrown on, the coil 17 will be substantially neutralized, thus breaking the shunt about resistance 22, weakening coil 21 and causing the regulator to permit the generator to resume action.

The operation of this system is substantially as follows:—Assuming the generator to be running and to have built up to such an extent as to cause the closing of the main switch 9, the battery being empty, the charging current will be equal to the full generator capacity, as the voltage in coil 21 is low and coil 6 is so proportioned, as above set forth, as to achieve this end. If, for example, the current exceeds this predetermined limit, the shunt about resistance 3 will be broken, thus cutting down the generator output, permitting the shunt 27 again to close and this cycle of operations repeating itself to maintain the output at the desired value. The charge now progresses and even though one-third of the battery were accidentally short-circuited, the generator would be protected against dangerous overload, due to the above proportioning of the coils. As the battery voltage rises the current in coil 6 required to produce the assumed constant field, acting on member 26, falls, and as the charge approaches completion the current is of exactly the predetermined value best suited for such a stage of charge. Upon the battery becoming fully charged the coil 17 will cause the shunting of a portion of resistance 22, thus strengthening coil 21; with a given voltage across the mains, and cause the generator to float on the mains without a substantial output. If, however, the lamps were turned on, the current would not be unnecessarily drawn from the battery, leaving the generator idle, as the differential coil would cause the breaking of the shunt about resistance 22, thus permitting the regulator 7 to resume its normal action and the generator to give an output of full battery charging voltage and a current which would be divided between the battery and the lamp-load. In this manner unnecessary depletion of the battery charge and corresponding wear on the battery is avoided.

It will thus be seen that the objects of this invention are achieved in apparatus of the nature of that above set forth and that this mechanism comprises merely a single regulator, the actuating magnet of which is compound wound. It will also be seen that the proper values of resistance and winding of the coils being once chosen, no fine adjustments are required in use and the apparatus is well suited to meet the needs of practical service.

Certain features herein shown and described are shown, described and claimed in my co-pending application, Serial Number 598,532, filed December 21, 1910, and accordingly are not claimed herein.

Having described my invention, what I claim as new and desire to secure by Letters Patent is:

1. In apparatus of the class described, in combination, a generator, a storage battery connected to be charged from said generator, a regulating device for said generator comprising a voltage coil, and a generator current coil coacting to control its action, a resistance in series with said voltage coil, and means controlled in accordance with the voltage of said generator adapted to shunt said resistance.

2. In apparatus of the class described, in combination, a generator, a battery connected to be charged from said generator, a regulator for said generator comprising a voltage coil, and a generator current coil coacting to control its action, a resistance in series with said voltage coil across the generator mains, and voltage-controlled means adapted to shunt a portion of said resistance.

3. In apparatus of the class described, in combination, a generator, a regulating device for said generator comprising a voltage coil, a resistance in series with said voltage coil, voltage-controlled means adapted to shunt said resistance, a storage battery adapted to receive current from said generator, translating devices adapted to receive current from said generator or battery, and means acting in accordance with the current flowing to said translating devices adapted to oppose the action of said voltage-controlled means.

4. In apparatus of the class described, in combination, a generator, a regulator for said generator comprising a voltage coil, a resistance in series with said voltage coil across the generator mains, voltage-controlled means adapted to shunt a portion of said resistance, a storage battery adapted to receive current from said generator, translating devices adapted to receive current from said generator or battery, and means acting in accordance with the current flowing to said translating devices adapted to oppose the action of said voltage-controlled means.

5. In apparatus of the class described, in combination, a generator having a shunt field winding, means comprising a vibratory member adapted to affect the output of said generator, an electro-magnetic device having a current coil and a voltage coil adapted jointly to tend to attract said vibratory member and reduce the generator output, means adapted abruptly to strengthen said voltage coil upon the voltage across the mains reaching a predetermined value, translating devices adapted to receive current from said generator, and means acting in accordance with the current flowing to said translating devices to oppose said second means.

6. In apparatus of the class described, in combination, a generator having a shunt field winding, a resistance element in series with said field winding, means comprising a vibratory member adapted to shunt said resistance, an electro-magnetic device comprising a generator current coil and a voltage coil adapted by the conjoint action of said coils to reduce the current through the shunt about said resistance element, a resistance element in series with said voltage coil, and voltage-controlled means adapted to vary the effect of said last resistance.

7. In apparatus of the class described, in combination, a generator having a shunt field winding, a resistance in series with said winding, means adapted to shunt said resistance, an electro-magnetic device comprising a generator current coil and a voltage coil controlling the shunt about said resistance, a resistance in series with said voltage coil, and voltage-controlled means controlling a shunt about said last resistance.

8. In apparatus of the class described, in combination, a generator having a shunt field winding, a resistance element in series with said field winding, means comprising a vibratory member adapted to shunt said resistance, an electro-magnetic device comprising a generator current coil and a voltage coil adapted by the conjoint action of said coils to reduce the current through the shunt about said resistance element, a resistance element in series with said voltage coil, voltage-controlled means adapted to vary the effect of said last resistance, translating devices connected to receive current from said generator, and means acting in accordance with the current flowing to said translating devices and adapted to oppose the action of said voltage-controlled means.

9. In apparatus of the class described, in combination, a generator having a shunt field winding, a resistance in series with said winding, means adapted to shunt said resistance, an electro-magnetic device comprising a generator current coil and a voltage coil controlling the shunt about said resistance, a resistance in series with said voltage coil, voltage-controlled means controlling a shunt about said last resistance, translating devices adapted to receive current from said generator, and means acting in accordance with the current flowing to said translating devices and adapted to oppose the action of said voltage-controlled means.

10. In apparatus of the class described, in combination, a generator having a shunt field winding, a resistance element in series with said field winding, a resistance element in parallel with said field winding, means comprising a vibratory member controlling a shunt about said first resistance element, an electro-magnetic device comprising a generator current coil and a voltage coil adapted by the conjoint action of said coils to reduce the current through said shunt, a resistance element in series with said voltage coil, a battery and translating devices each adapted to receive current from said generator, and means controlled differentially in accordance with the voltage of said battery and the current to said translating devices adapted to vary the effect of said last resistance element.

11. In apparatus of the class described, in combination, a generator having a shunt field winding, a resistance element in series with said field winding, a resistance element in parallel with said field winding, means comprising a vibratory member controlling a shunt about said first resistance element, an electro-magnetic device comprising a generator current coil and a voltage coil adapted by the conjoint action of said coils to reduce the current through said shunt, a resistance element in series with said voltage coil, a battery and translating devices each adapted to receive current from said generator, a normally open shunt about said last resistance element, and an electro-magnetic device controlling said shunt and comprising differential coils, one of which is formed and proportioned to present a field substantially proportional to the battery voltage and the other of which is formed and proportioned to present a field substantially proportional to the current flowing to said translating devices.

12. In apparatus of the class described, in combination, a generator, a storage battery adapted to receive current therefrom, means comprising a vibratory member adapted to affect the output of said generator, said member being resiliently urged in one direction, a coil wound and connected to present a field substantially proportional to the generator output and mounted to attract said vibratory member, a coil wound and connected to present a field substantially proportional to the voltage across the generator mains and mounted to attract said vibratory member, said coils being so wound and proportioned as to actuate said vibratory member with substantially full generator capacity charging current in said first coil and empty battery charging voltage across the mains or with a predetermined finishing charging current in said first coil and full battery charging voltage across the mains, and means adapted upon said battery being completely charged to increase the strength of said voltage coil to such an extent as to actuate said vibratory member with substantially zero current in said first coil.

13. In apparatus of the class described, in combination, a generator, a storage battery adapted to receive current therefrom, means comprising a vibratory member adapted to affect the output of said generator, said member being resiliently urged in one direction, a coil wound and connected to present a field substantially proportional to the generator output and mounted to attract said vibratory member, a coil wound and connected to present a field substantially proportional to the voltage across the generator mains and mounted to attract said vibratory member, said coils being so wound and proportioned as to actuate said vibratory member with substantially full generator capacity charging current in said first coil and empty battery charging voltage across the mains or with a predetermined finishing charging current in said first coil and full battery charging voltage across the mains, translating devices adapted to receive current from said generator, means adapted upon said battery being completely charged to increase the strength of said voltage coil to such an extent as to actuate said vibratory member with substantially zero current in said first coil, and means actuated in accordance with the current flowing to said translating devices adapted to oppose the action of said last-mentioned means.

14. In apparatus of the class described, in combination, a generator, a storage battery connected to be charged from said generator, a regulating device for said generator comprising a voltage coil and a current coil coacting to control its action, and means adapted to affect the current through said voltage coil, said means comprising a second voltage coil and a current coil opposing said second voltage coil.

15. In apparatus of the class described, in combination, a shunt wound generator, a pair of resistance elements respectively connected in series and in shunt with the field winding of said generator, means shunting said series resistance element, electro-magnetic means adapted to change the current passing through said shunting means and voltage controlled means adapted to vary the current passing through said electromagnetic means.

In testimony whereof I affix my signature, in the presence of two witnesses.

JOSEPH BIJUR.

Witnesses:
HELEN M. SEAMANS,
ROBERT S. BLAIR.